United States Patent
Webster et al.

(10) Patent No.: US 8,393,647 B2
(45) Date of Patent: Mar. 12, 2013

(54) BOLT-ON TRANSITION COUPLING FOR PIPING SYSTEM

(75) Inventors: Kevin A. Webster, Clayton, NC (US);
John C. Baier, Clayton, NC (US);
Jeromy E. Higgins, Raleigh, NC (US)

(73) Assignee: Delaware Capital Formation, Inc., Wilmington, DE (US)

( * ) Notice: Subject to any disclaimer, the term of this patent is extended or adjusted under 35 U.S.C. 154(b) by 195 days.

(21) Appl. No.: 12/847,246

(22) Filed: Jul. 30, 2010

(65) Prior Publication Data

US 2011/0025048 A1    Feb. 3, 2011

Related U.S. Application Data

(60) Provisional application No. 61/230,427, filed on Jul. 31, 2009.

(51) Int. Cl.
*F16L 33/00* (2006.01)
(52) U.S. Cl. .................. 285/242; 285/259
(58) Field of Classification Search .......... 285/242, 285/259, 12, 123.1, 123.3, 123.9, 123.12, 285/123.15
See application file for complete search history.

(56) References Cited

U.S. PATENT DOCUMENTS

| | | | | |
|---|---|---|---|---|
| 2,015,081 | A * | 9/1935 | McElhany et al. | 285/242 |
| 3,142,502 | A * | 7/1964 | Luther | 285/242 |
| 3,181,900 | A * | 5/1965 | Hayward, Jr. | 285/243 |
| 3,249,371 | A * | 5/1966 | Peterman | 285/253 |
| 3,257,132 | A * | 6/1966 | Lyons | 285/253 |
| 3,367,683 | A * | 2/1968 | Mattson | 285/243 |
| 3,495,855 | A * | 2/1970 | Currie | 285/253 |
| 4,593,942 | A * | 6/1986 | Loker | 285/253 |
| 4,603,888 | A * | 8/1986 | Goodall et al. | 285/55 |
| 4,758,029 | A * | 7/1988 | Davis | 285/253 |
| 5,297,896 | A | 3/1994 | Webb | |
| 5,306,051 | A * | 4/1994 | Loker et al. | 285/222.1 |
| 5,527,130 | A | 6/1996 | Webb | |
| 5,678,867 | A * | 10/1997 | Monaghan et al. | 285/242 |
| 6,315,003 | B1 | 11/2001 | Albino | |
| 6,565,127 | B2 | 5/2003 | Webb et al. | |
| 7,073,976 | B1 * | 7/2006 | Webb | 405/52 |
| 7,104,727 | B1 * | 9/2006 | Webb | 405/53 |
| 2012/0042503 | A1 * | 2/2012 | Zeiber | 29/525.13 |

OTHER PUBLICATIONS

Webpage featuring "DoubleTrac® Fitting Assembly," by OmegaFlex, Inc., http://www.doubletrac.net/about.html (retrieved from the internet on Jul. 7, 2009).
Webpage featuring "Product Specifications/DoubleTrac® Flexible Piping," by OmegaFlex, Inc., http://www.doubletrac.net/specs,html (retrieved from the internet on Jul. 7, 2009).

* cited by examiner

*Primary Examiner* — Aaron Dunwoody
(74) *Attorney, Agent, or Firm* — Thompson Hine L.L.P.

(57) ABSTRACT

A transition coupling system for use with a dual containment pipe which includes an inner primary pipe and an outer secondary pipe with an interstitial space therebetween, the transition coupling comprising. The transition coupling includes an inner body configured to engage an inner surface of the primary pipe and an outer body configured to engage an outer surface of the secondary pipe. The outer body includes at least two releasably attachable portions, at least one of which is movable relative to the other in a radial direction thereof. The inner body and the outer body are configured to define a gap therebetween when coupled to the piping system such that the gap is generally sealed and in communication with the interstitial space.

20 Claims, 8 Drawing Sheets

BOLT-ON TRANSITION COUPLING FOR PIPING SYSTEM

This application claims priority to U.S. Provisional Patent Application Ser. No. 61/230,427, entitled TRANSITION COUPLING FOR PIPING SYSTEM filed on Jul. 31, 2009, the entire contents of which are hereby incorporated by reference.

The present invention is directed to a bolt-on transition coupling, and more particularly, to a transition coupling for a dual containment piping system.

BACKGROUND

Coaxial or dual containment piping systems may be utilized in systems in which fuel or other environmentally sensitive fluids are stored and/or transported. Such dual containment systems are often utilized at refueling stations, such as gas stations, but can be used in a variety of other settings as well. In such a system, the inner, or primary, pipe is designed to carry the fluid, and an outer, or secondary, pipe is positioned about the primary pipe to provide secondary containment to the primary pipe. In some systems the pressure of the interstitial space between the primary and secondary pipes is monitored such that any leaks or integrity losses may be able to be detected by a change in interstitial pressure.

Couplings in dual containment systems can be difficult to implement since it is desired to maintain the integrity of the primary pipe, secondary pipe, and interstitial space. In such cases transition couplings may be used when it is desired to preserve the interstitial pressure of the piping system, or communicate the interstitial pressure to a remote location. For example, transition couplings may be utilized at T-fittings, elbow fittings, straight connections or fittings, sump connections, at a terminus of the pipe system, etc. However, existing transition couplings can be difficult to install, and may not provide sufficient sealing characteristics.

SUMMARY

In one embodiment, the present invention is a bolt-on transition coupling system for use with a dual containment pipe which includes an inner primary pipe and an outer secondary pipe with an interstitial space therebetween. The transition coupling includes an inner body configured to engage an inner surface of the primary pipe and an outer body configured to engage an outer surface of the secondary pipe. The outer body includes at least two releasably attachable portions, at least one of which is movable relative to the other in a radial direction thereof. The inner body and the outer body are configured to define a gap therebetween when coupled to the piping system such that the gap is generally sealed and in communication with the interstitial space.

DETAILED DESCRIPTION

Figure 1:
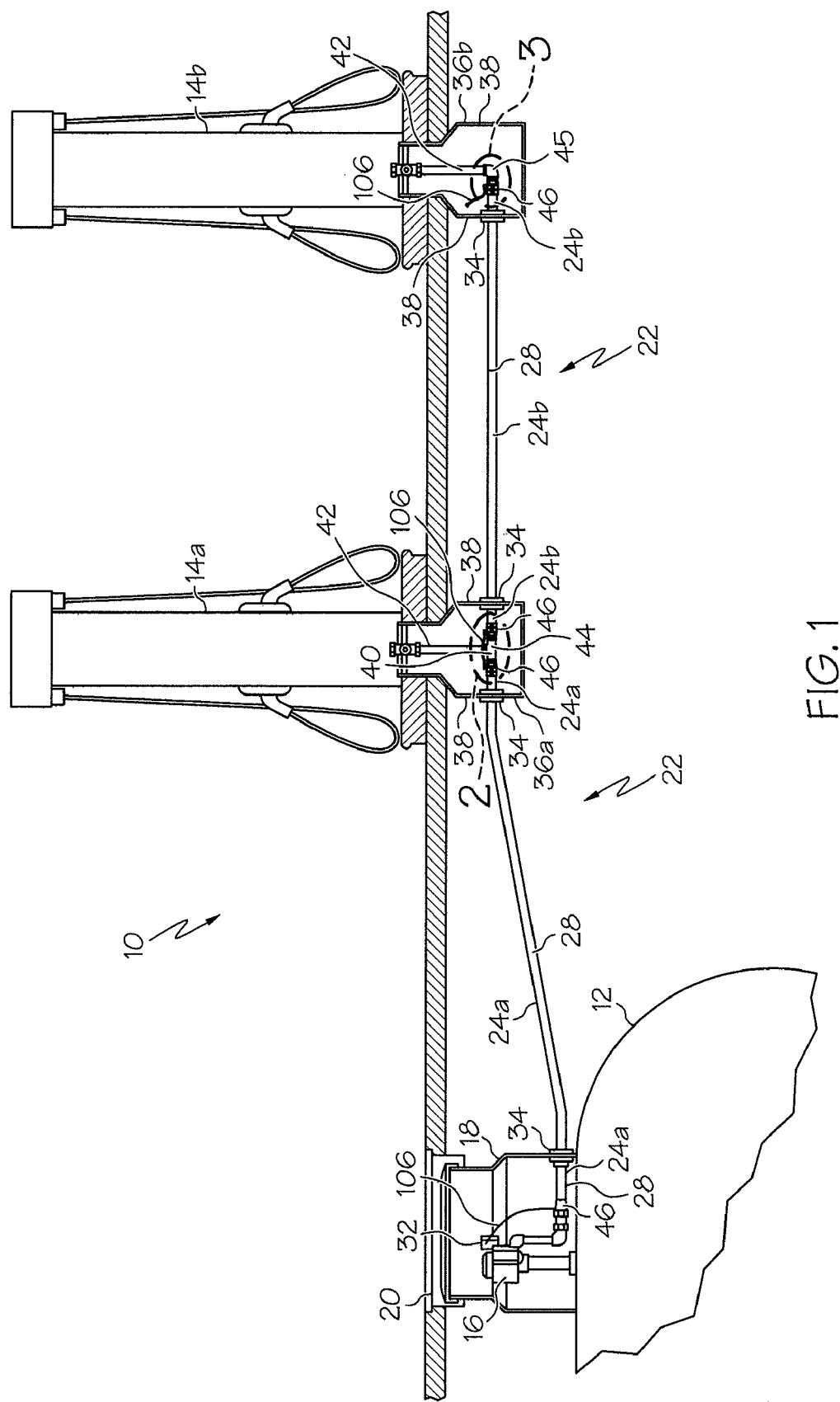
FIG. 1 is a schematic representation of an underground piping system in which the bolt-on transition coupling of the present invention may be utilized.

As shown in FIG. 1, a fuel dispensing system, generally designated 10, may include a storage tank 12 configured to store fuel for delivery to various dispensers 14a, 14b. In the illustrated embodiment, the tank 12 is a below ground tank, and each dispenser 14a, 14b is positioned above ground in the manner of existing retail or commercial fueling stations or gas stations. However, the tank 12 could be an above ground tank, or partially below ground tank, and take various forms beyond that specifically shown in FIG. 1. The system 10 can be utilized to dispense any of a wide variety of fluids or fuels, including but not limited to petroleum-based fuels such as gasoline, diesel, natural gas, biofuels, propane, ethanol or the like.

A pump 16 is positioned adjacent to or on top of the tank 12. The pump 16 is in fluid communication with the tank 12 to pump fuel from the tank 12 to the dispensers 14a, 14b. The pump 16 is positioned inside a fluid-tight sump 18 to provide secondary containment to the pump 16. A manhole cover 20 is positioned at the top of the tank sump 18 to provide surface access to the sump 18. The system shown in FIG. 1 is a "pressure system" in which the pump 16 urges fluid, under pressure, to the various dispensers 14a, 14b. However, the device and method disclosed herein can also be used in so-called "suction" systems, in which dispensers 14a, 14b include or are associated with pumps that pull, or suck, fluid from the tank 12 to each dispenser 14a, 14b. Moreover, various other dispensers 14a, 14b, coupled in various configurations besides that shown in FIG. 1, may be utilized. Similar systems are shown in U.S. Pat. Nos. 6,565,127 to Webb et. al, and 7,104,727 to Webb, the entire contents of both of which are hereby incorporated herein by reference.

The fuel dispensing system 10 includes a pipe system 22 which includes a plurality of pipe segments 24a, 24b that fluidly connect the tank 12/pump 16 and the dispensers 14a, 14b. Although only two pipe segments 24a, 24b are shown, the number of pipe segments 24 can be adjusted as desired to meet the requirements of any particular system. As shown in FIGS. 5-8, the pipe system 22, and each pipe segment 24a, 24b, may be a coaxial or dual-containment-style pipe. In this manner, each pipe segment 24a, 24b includes an inner, supply, or primary pipe 26 coaxially received within an outer, containment, or secondary pipe 28. The secondary pipe 28 receives the primary pipe 26 therein and is designed to surround and capture the primary pipe 26 and contain any fluid should the primary pipe 26 leak or otherwise fail. The primary 26 and secondary pipes 28 define an interstitial space 30 therebetween.

The primary pipe 26 can be made from a variety of materials, such as non-degradable, inert material, including nylon, PVDF, polyethylene or other materials which are resistant to the fluid to be transported therethrough. The secondary pipe 28 can be made from a variety of materials, such as non-degradable, inert material, including nylon, PVDF, polyethylene or other materials which are resistant to the surrounding environment, as well as at least somewhat resistant to the fluid to be transported in the primary pipe 26.

A series of spacers, ribs, standoffs or the like (not shown) may be positioned in the interstitial space 30 and be coupled to, and/or radially extend between, the primary 26 and/or secondary 28 pipe to properly position the primary pipe 26 within the secondary pipe 28, and provide axially-extending channels about the primary pipe 26 to allow the flow of fluid along the primary pipe 26. For example, U.S. Pat. No. 5,297,896, the entire contents of which are incorporated herein, discloses such a rib arrangement. The secondary pipe 28 may be generally fluid-tight to contain leaks and allow pressure-testing, as will be described in greater detail below.

The primary pipe 26 is in fluid communication with the tank 12/pump 16, and is designed and configured to deliver fuel therethrough. The primary pipe 26 can be fixedly and generally non-removably received in the secondary pipe 28. Alternately, if desired, the primary pipe 26 may be removably received within the secondary pipe 28. The primary 26 and secondary 28 pipe can each be generally flexible and/or rigid, and have wide range of flexibility. The secondary pipe 28 can itself be contained within an external sleeve (not shown). Each pipe 26, 28 may be generally tubular/cylindrical (i.e. generally circular in cross section), but can have other shapes in cross section if desired.

As shown in FIG. 1, the system 10 may include a monitoring device 32 fluidly connected to the interstitial space 30 of the pipe system 22. The monitoring device 32 may be configured to track the pressure within the interstitial space 30 of the pipe system 22 and/or any changes (positive or negative) in pressure thereof, or monitor the amount of fluid (such as a test liquid) in the interstitial space 30. In this manner, the monitoring device 32 can provide early warning of leaks in the primary 26 and/or secondary 28 pipe and thereby minimize any potential contamination of the surrounding environment, fluid loss, and potential malfunctions. Although the monitoring device 32 is shown as being positioned in the tank sump 18, the monitoring device 32, or multiple monitoring devices, can be positioned at various locations along the pipe system 22, including in the dispenser sumps 36.

Pipe segment 24a begins inside the tank sump 18 and extends through the tank sump 18 via a sump penetration seal 34. In an alternate embodiment, rather than extending continuously through the tank sump 18, the pipe segment 24a can be broken into two parts, one on each side of the tank sump 18. From there the pipe segment 24a extends to dispenser sump 36a, passing through a sidewall 38 of the dispenser sump 36a (either as a single pipe run or multiple parts) via a seal 34. Similarly, pipe segment 24b begins inside the dispenser sump 36a and passes through the opposite sidewall 38 of the sump 36a via a seal 34. Pipe segment 24b then extends to and enters the sidewall 38 of another dispenser sump 36b. Additional pipe segments 24 can extend to additional dispenser sumps 36, as is apparent to one of ordinary skill in the art.

In the illustrated embodiment, each pipe segment 24a, 24b extends through the walls of the associated sumps 18, 36a, 36b, (via or through a seal 34) so that connections to pipe segment 24a 24b can be made inside the associated sump 18, 36a, 36b. However, the system and method disclosed herein can also be used in fuel dispensing systems wherein the secondary pipe 28 terminates at the outer wall of a sump 18, 36, or in systems having various other coupling arrangements or configurations than those specifically shown in FIG. 1.

Figure 2:
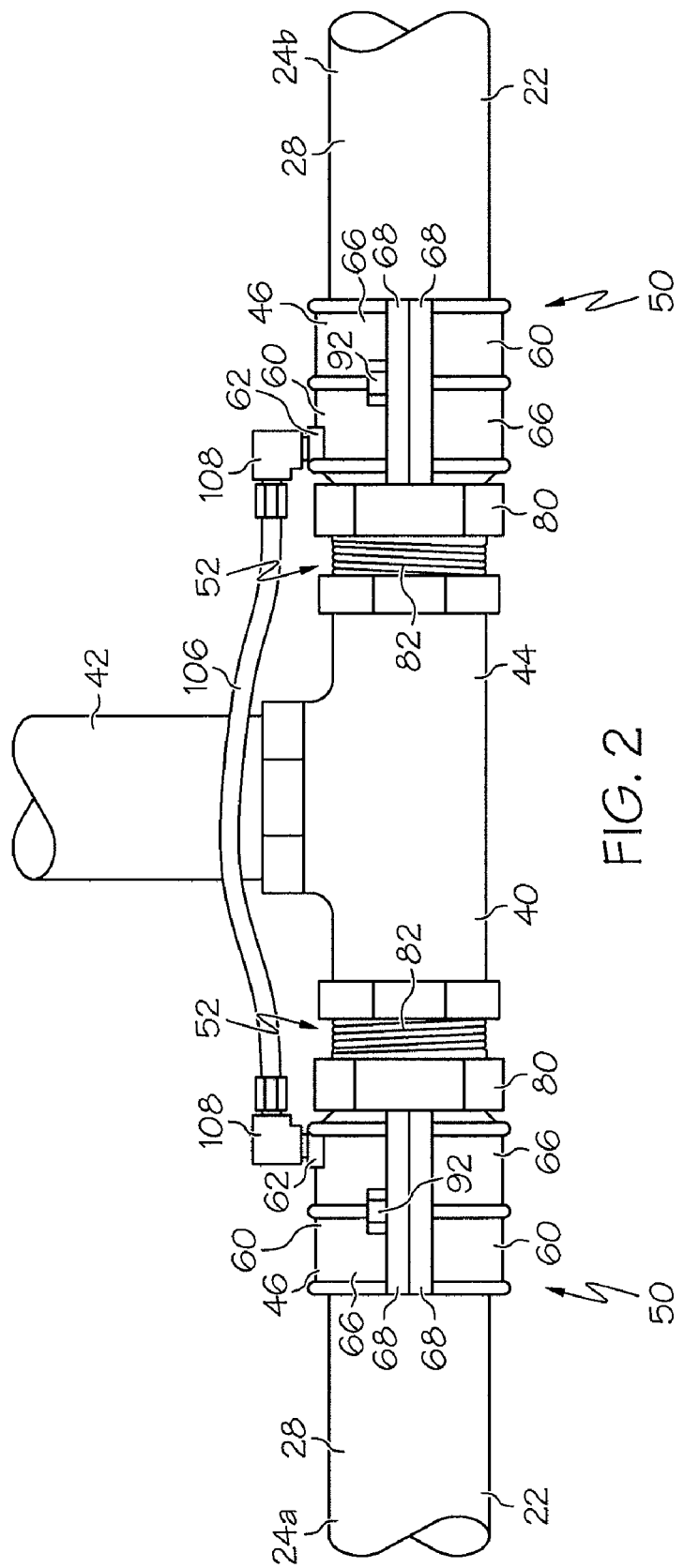
FIG. 2 is a detailed view of the area indicated in FIG. 1.
Figure 3:
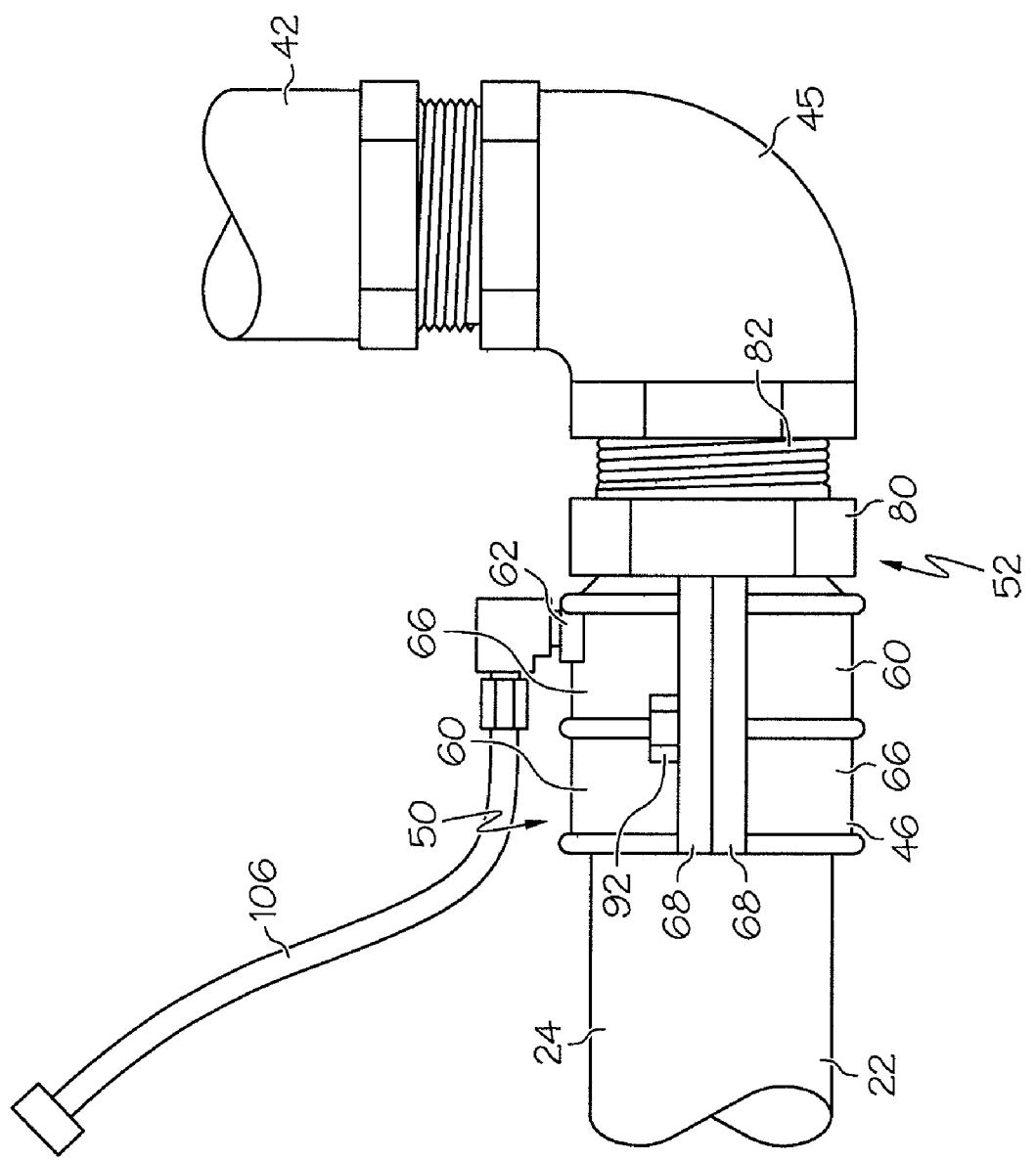
FIG. 3 is a detailed view of the area indicated in FIG. 1.

As shown in FIGS. 1 and 2, at a position inside the dispenser sump 36a, a T-fitting 40, Y-fitting or the like is coupled to the pipe segments 24a, 24b. A riser pipe 42 of the T-fitting allows fuel from the primary pipe 26 of pipe segment 24a to flow vertically upward to the associated dispenser 14a. The horizontal run 44 of the T-fitting 40 is coupled to the downstream pipe segment 24b, more particularly the primary pipe 26 of pipe segment 24b, to fluidly couple the tank 12/pump 16 to the downstream dispenser 14b. As shown in FIGS. 1 and 3, an elbow fitting 45 may be utilized to couple the pipe segment 24b to a riser pipe 42.

In the junction shown in FIG. 2, the primary pipe 26 of the pipe segments 24a, 24b are fluidly coupled via the horizontal run 44 of the T-fitting 40 as noted above. However, it may also be desired to fluidly couple the interstitial spaces 30 of the pipe segments 24a, 24b so that, for example, the pressure in the interstitial space 30 of the pipe system 22 as a whole can maintain its integrity and be monitored by the monitoring device 32 or otherwise. Accordingly, the transition coupling or bolt-on transition coupling 46 shown herein be used to, among other things, fluidly couple the interstitial spaces 30 of the pipe segments 24a, 24b. The transition coupling 46 can also be utilized to fluidly communicate the interstitial space 30 to a monitoring device 32, to cap the interstitial space 30, etc.

As best shown in FIGS. 4-7, the transition coupling 46 includes an insert, or a body 48, which forms the radially inner-most portion of the transition coupling 46. The transition coupling 46 also includes an outer portion, outer body or pipe coupling 50 at one axial end that is removably coupled to, or configured to be removably coupled to, a first axial end of the body 48. The transition coupling 46 further includes a fitting coupling 52 coupled to the second, opposite axial end of the body 48. The insert 48, pipe coupling 50 and/or fitting coupling 52 can be made from a wide variety of materials, such as steel, including stainless steel, coated steel or the like, but can be made of various other metals, as well as composite and non-metallic materials. In one case, then, all of the wetted surfaces of the transition coupling 46 are stainless steel. In the illustrated embodiment the insert 48, pipe coupling 50 and fitting coupling 52 are generally circular in cross section, but can have various other shapes in cross section in order to conform to the corresponding pipe segment 24 or other component to which it is to be coupled.

The body 48 is configured to be securely coupled to the inner surface of the primary pipe 26 of a pipe segment 24. In particular, in the illustrated embodiment, the first end or engagement surface 54 of the body 48 includes an annular ribbed, toothed, serrated, ridged, or barbed (collectively termed "ribbed" herein) outer surface 54. The barbed outer surface 54 may have a diameter generally corresponding to, or slightly larger than, the inner diameter of the associated primary pipe 26 to enable a tight mechanical fit and sealing connection therebetween. The body 48 may also include an annular groove 56 which receives an O-ring or base seal 58 therein to aid in sealing the body 48 and pipe coupling 50, as will be described in greater detail below.

The pipe coupling 50, in the illustrated embodiment, includes two separable clamp portions 60 which are releasably attachable together and/or to the body 48. In the illustrated embodiment, both clamp portions 60 are entirely separable from the body 48, although one or both of the clamp portions 60 may be permanently or generally non-removably (possibly flexibly, deformably or movably) coupled to the body 48. At least one of the clamp portions 60 includes a radially-extending access port 62 having an inner cavity 64 therein extending entirely through the clamp portion 60 and to an inner surface thereof.

Figure 4:
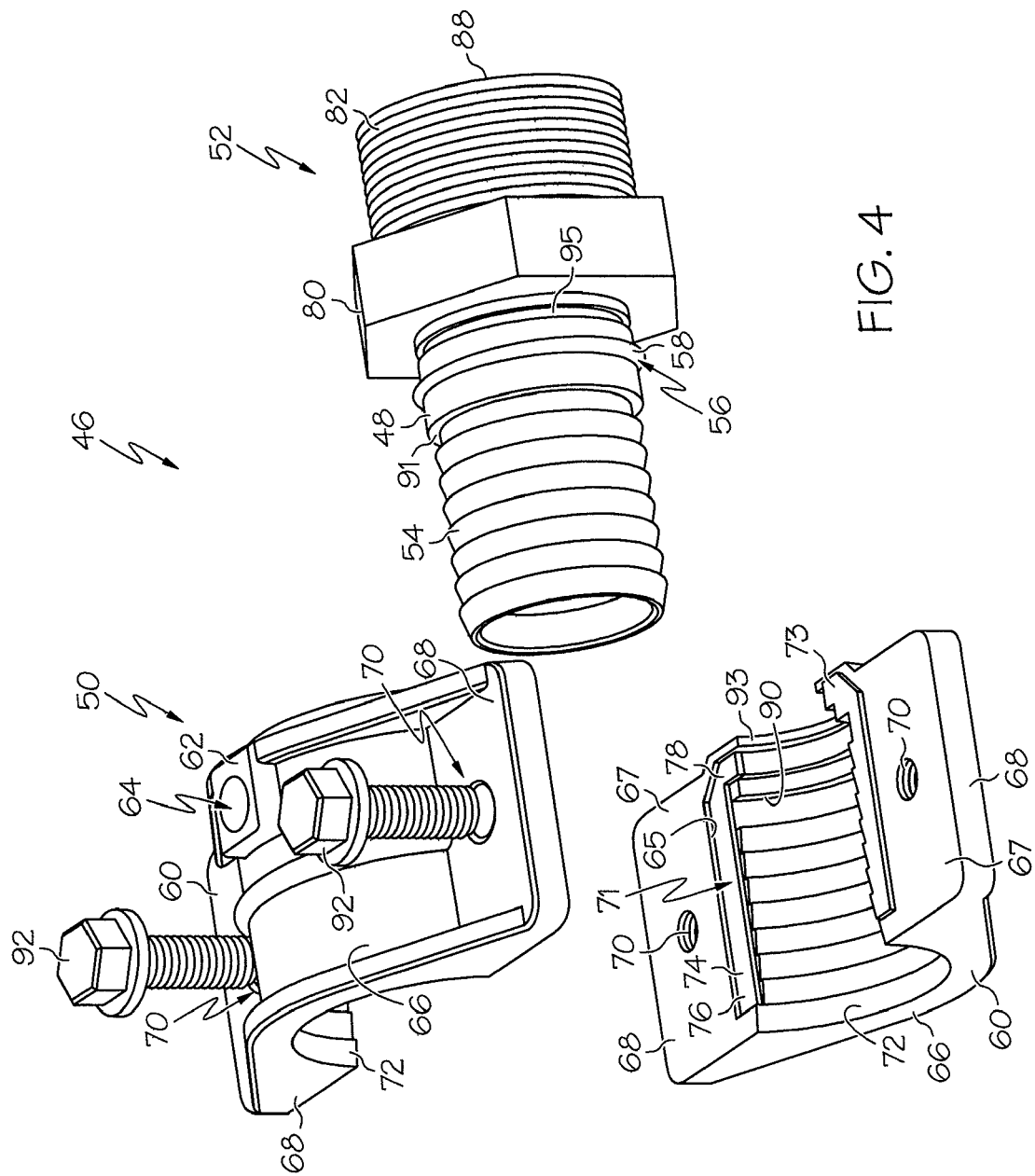
FIG. 4 is an exploded view of the transition coupling shown in FIGS. 1-3.

As best shown in FIG. 4, each clamp portion 60 may include a generally semi-cylindrical body 66 and a pair of opposed, generally flat, radially-extending opposed flanges 68. Each flange 68 has a hole 70 formed therethrough which is aligned with a hole 70 on the flange 68 of another clamp portion 60 when the clamp portions 60 are assembled. Each clamp portion 60 (and in particular on the inner surface 72 of semi-cylindrical body 66 thereof) may include an annular ribbed inner surface 72 therein. The inner surface 72 may have a radius or shape generally corresponding to, or slightly smaller than, the outer radius or shape of the associated secondary pipe 28 to enable a tight mechanical fit and sealing connection therebetween.

One flange 68 of each clamp portion 60 may include a generally "L" shaped recess 71 closely receiving a generally "L"-shaped seal 74 therein. The recess 71 and seal 74 are positioned at the radially inner, axially-rearward portion of the flange 68. The illustrated seal 74 has a thickness less than that of the recess 71 such that the seal 74 is recessed relative to the top flat surface 67 of the flange 68, leaving some of the vertical sidewalls 65 of each recess 71 exposed. Each seal 74 can be made of any of a wide variety of materials which are resilient/flexible and resistant to the fluid to be transported, such as synthetic rubber, rubber compositions (including VITON® material sold by E. I. Du Pont de Nemours & Company of Wilmington, Del.), a nitrile material, elastomers, polytetrafluoroethylene ("PTFE"), etc.

Each seal 74 includes a generally axially-extending portion 76 and a generally radially extending portion 78. The radially extending portion 78 can form the radially inner-most surface of the clamp portion 60/pipe coupling 50 at that location such that the seal 74 engages the secondary pipe 28 and/or O-ring 58 when the pipe coupling 50 is assembled, as described in greater detail below. In addition, the axially extending portion 76 can form the radially inner-most surface of the clamp portion 60, at least at the base of the teeth/ribs of the inner surface 72, to engage the secondary pipe 28.

Figure 8:
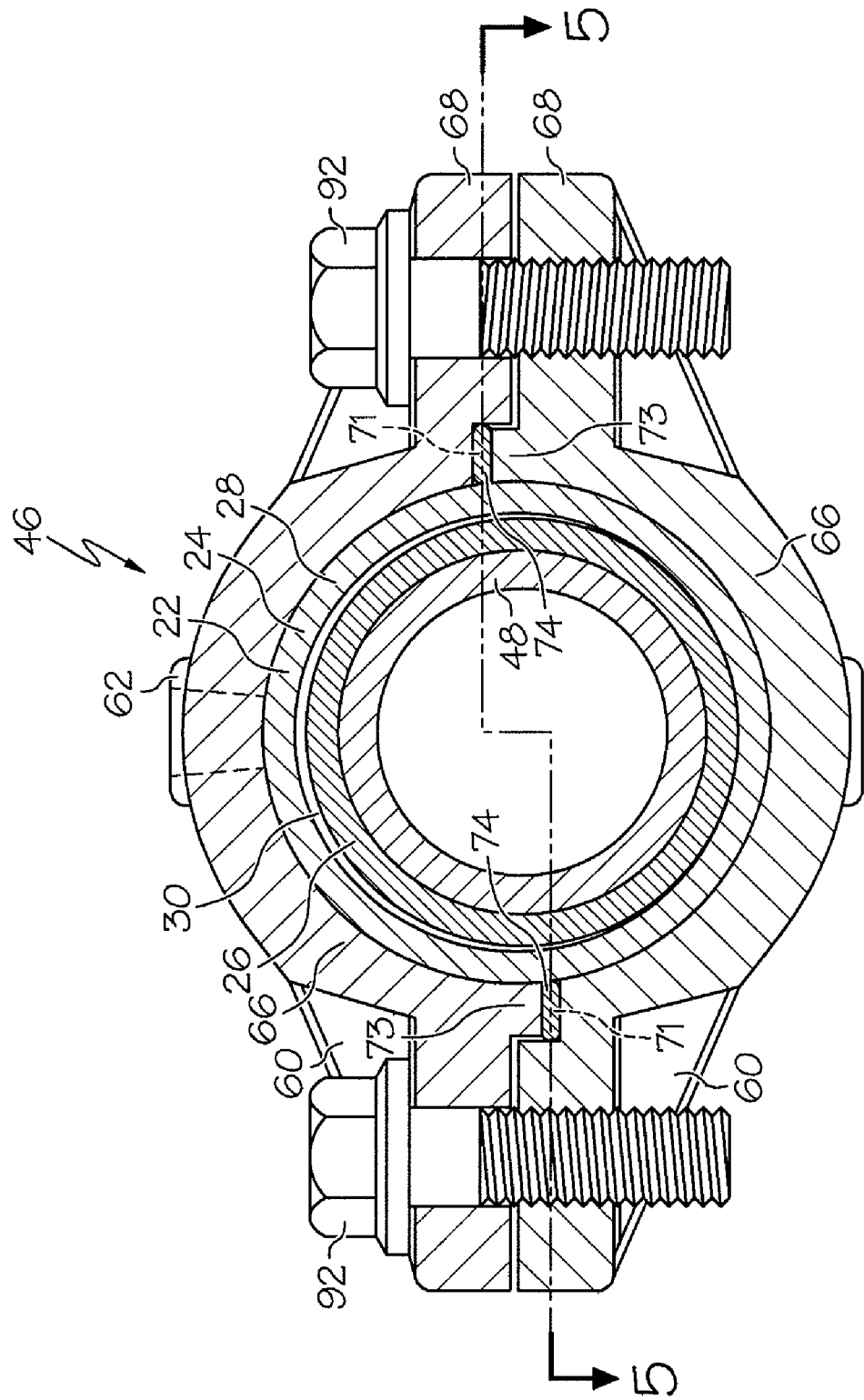
FIG. 8 is a cross section taken along line 8-8 of FIG. 7.

The other flange 68 of each clamp portion 60 includes a protrusion 73 shaped and sized to closely match the recess 71/seal 74. The protrusion 72 may carry the teeth/ribs of the inner surface 72 to aid in gripping and sealing the pipe segment 24. In this manner, when the clamp portions 60 are fit together, as shown in FIG. 8, each protrusion 73 is received in a recess 71 on the other clamp portion 60 and engages the associated seal 74. In an alternate embodiment, the position of the seal 74 is reversed such that the seals 74 are located on the protrusions 73 instead of the recesses 71. Further alternately, a seal 74 can be positioned on both the protrusions 73 and recesses 71. In a further alternate embodiment, the recesses 71 and protrusions 73 are eliminated, and a seal 74 is instead located on the flat upper surface 67 of the associated flange 68. In this manner each flange 68 carries a seal 74 thereon which engages a seal 74 on an opposite flange 68 when assembled.

The fitting coupling 52 is mounted about the body 48 in the illustrated embodiment and includes a generally annular base portion 80, which may have a hexagon or other polygon-shaped outer surface, as shown in FIG. 4, for ease of gripping with a wrench. The base portion 80 includes a set of annular grooves 84 on its inner surface thereof (FIGS. 5 and 6), each of which receives an O-ring 86 positioned between the fitting coupling 52 and the body 48 to form a seal therewith. The O-rings 86 (as well as the O-ring 58 described above) can be made from the same or similar materials as those described above for the seals 74.

The fitting coupling 52 may further include an annular collar portion 82 extending axially forwardly from the base portion 80. In the illustrated embodiment the collar portion 82 is externally threaded and the fitting coupling 52 takes the form of a male swivel nut. However, the male threaded portion 82 can instead take the form of a female threaded portion, in which case the collar portion 82 or body 48 would be internally threaded.

Figure 5:
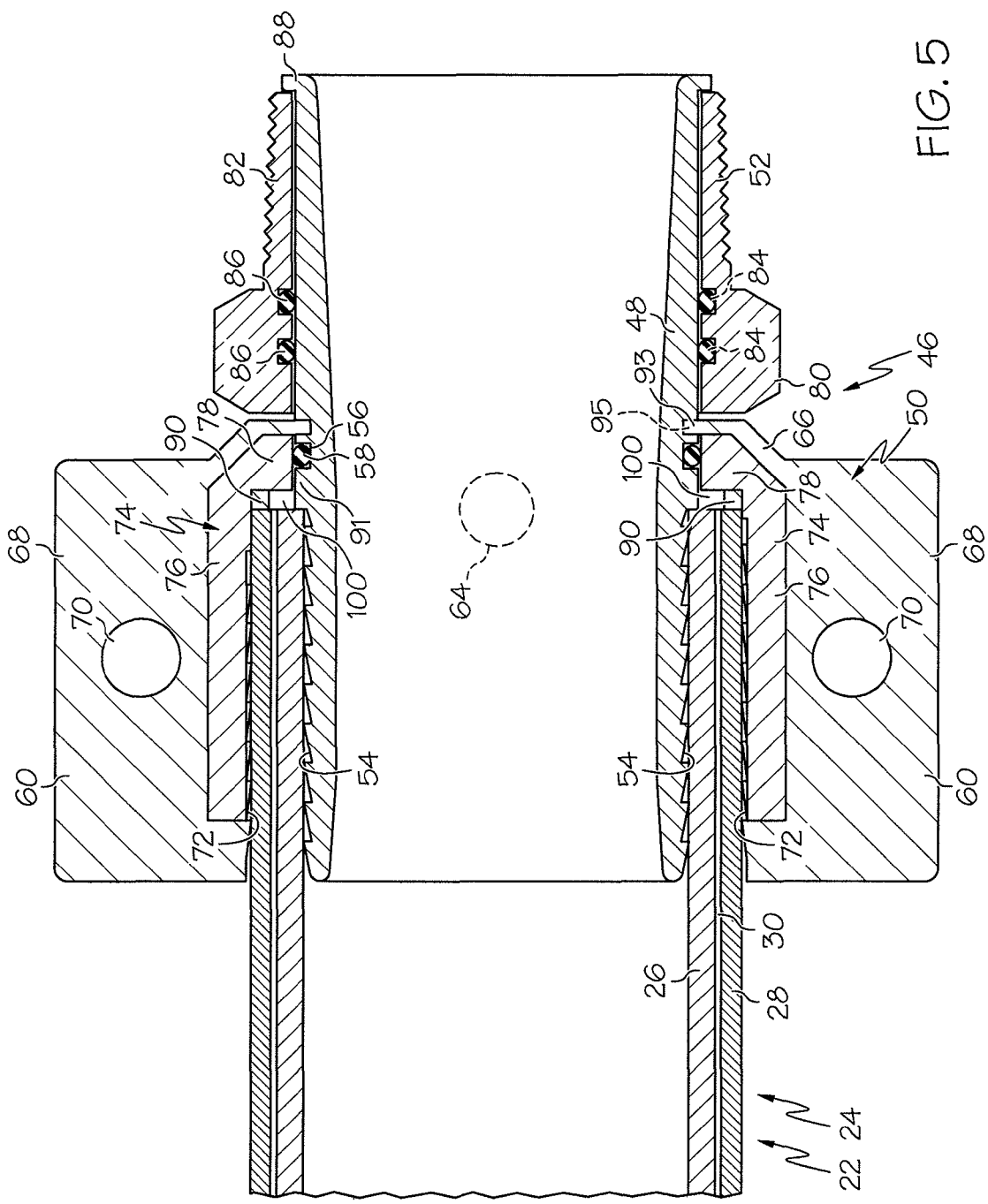
FIG. 5 is a cross section of the transition coupling of FIG. 4, shown in an assembled position about a pipe, taken along line 5-5 of FIG. 8.
Figure 6:
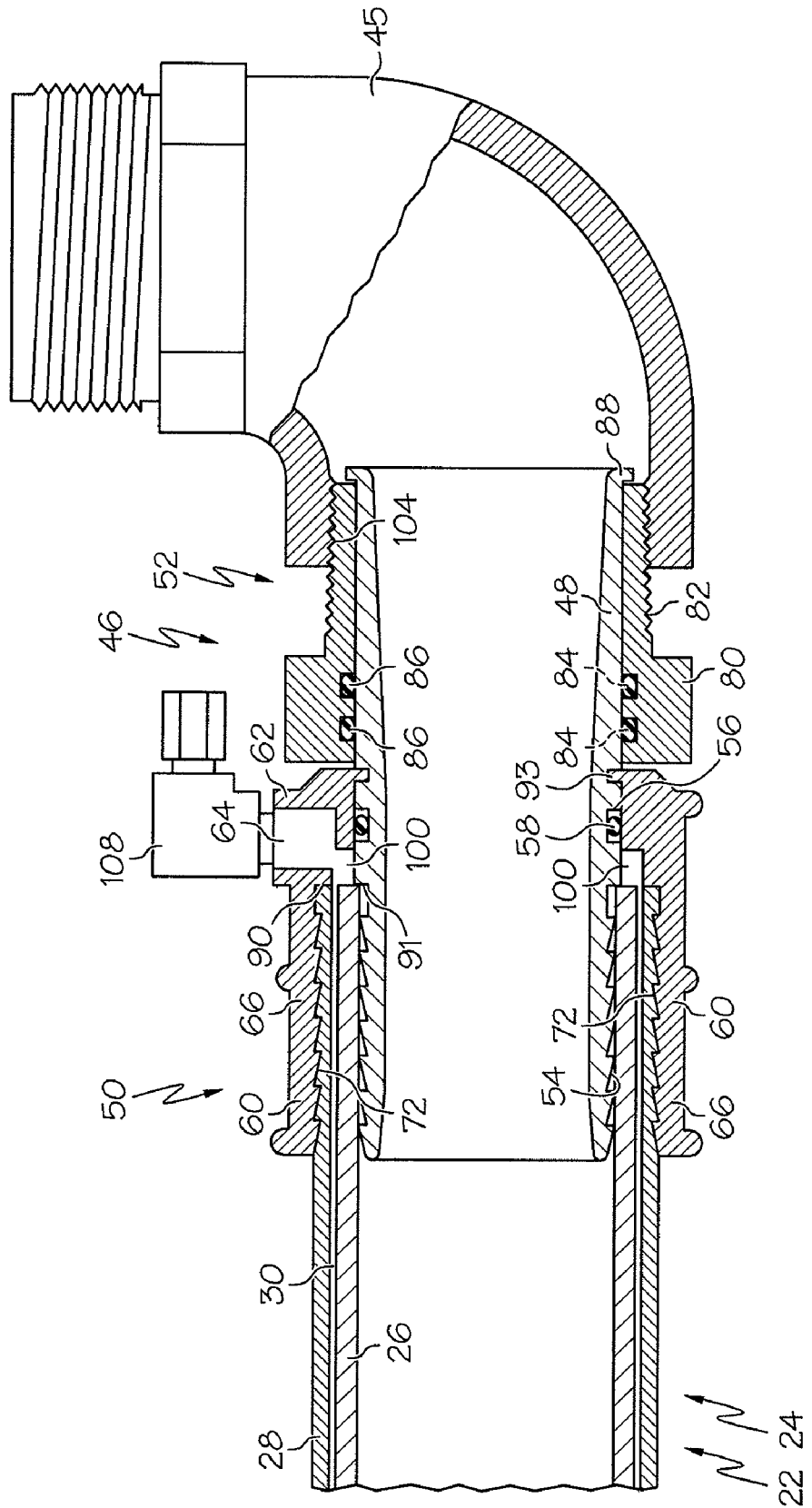
FIG. 6 is a side cross section of the transition coupling and pipe of FIG. 5.

The fitting coupling 52 is compression formed onto the body 48, and the axial tip 88 of the body 48 is swaged or deflected radially outwardly over the end of the fitting coupling 52, as shown in FIGS. 5 and 6, to couple the body 48 and fitting coupling 52. However, the fitting coupling 52 can be secured to the body 48 by any of a variety of manners, such as a friction fit, adhesive, mechanical couplings, cam-over levers, metallurgical connections, casting as a single piece, releasable connections, etc. Moreover, rather than including the fitting coupling 52, the distal/forward end of the transition coupling 52/body 48 can simply take the form of a run of pipe (threaded or unthreaded), a reducing coupling, or other similar component, or the transition coupling 46 may lack the fitting coupling 52 entirely.

In order to use the transition coupling 46, the terminal end of a pipe segment 24 is first accessed, wherein the primary 26 and secondary 28 pipe both terminate at approximately in the same axial location. The terminal end of the pipe segment 26 can be a straight cut made in a radial plane, and the secondary pipe 28 does not need to be trimmed back. The body 48 of the transition coupling 46 is urged into the primary pipe 26 of the pipe segment 24 such that the barbed surface 54 of the body 48 engages the inner diameter of the primary pipe 26, thereby generally axially and sealingly locking the body 48 in place. The body 48 includes an annular rib 91 (FIGS. 4-6) positioned adjacent to the barbed surface 54. The rib 91 engages the axial end of the pipe segment 24 when the body 48 is inserted into the correct axial depth to prevent over-insertion thereof. If desired, an O-ring, seal or the like (not shown) can be positioned between the barbed inner surface 54 and the primary pipe 26 to aid in forming a sealed connection therebetween.

Next, the clamp portions 60 are positioned about the pipe segment 24/body 48 such that their openings 70 are aligned and the pipe segment 24 is trapped between the clamp portions 60 and the body 48. The clamp portions 60 are moved toward each other in the radial direction. Fasteners, such as bolts 92, are then passed through the aligned openings 70 of the flanges 68 and threaded into the opposite one of the flanges 68 (alternately, a nut may be threaded onto the bolts 92). The bolts 92 extend in a direction generally perpendicular to an axis of the transition coupling 46/pipe system 22 and are tightened down to pull the clamp portions 60 together. Each flange 68 provides a flat surface which supports the bolts 92 as they are threaded down.

Pulling the clamp portions 60 together causes the barbed inner surface 72 of the clamp portions 60 to lockingly and/or sealingly engage the outer surface of the secondary pipe 28, thereby further axially locking and/or sealing the transition coupling 46 to the pipe segment 24. The pipe coupling 50 may be configured to prevent over tightening of the clamp portions 60 to prevent collapse of the interstitial space 30 such as by, for example, limiting the extent to which the bolts 92 can be tightened. If desired, an O-ring, seal or the like (not shown) can be positioned between the barbed inner surface 72 of the clamp portions 60 and the secondary pipe 28 to aid in forming a sealing connection therebetween.

Pulling the clamp portions 60 together in the radial direction also exerts a radial or squeezing pressure on the pipe segment 24 which can cause greater engagement between the barbed surface 54 of the body 48 and the primary pipe 26. However, it should be understood that the clamp portions 60 can be joined/sealed together by any of a variety of mechanisms and methods besides the bolts 92 shown herein, such as by using other threaded fasteners, snap-locks, interference fits, clamps, worm-drive clamps, straps, ratcheting straps, swaging or deformation, metallurgical joining methods, adhesives, etc.

Figure 7:
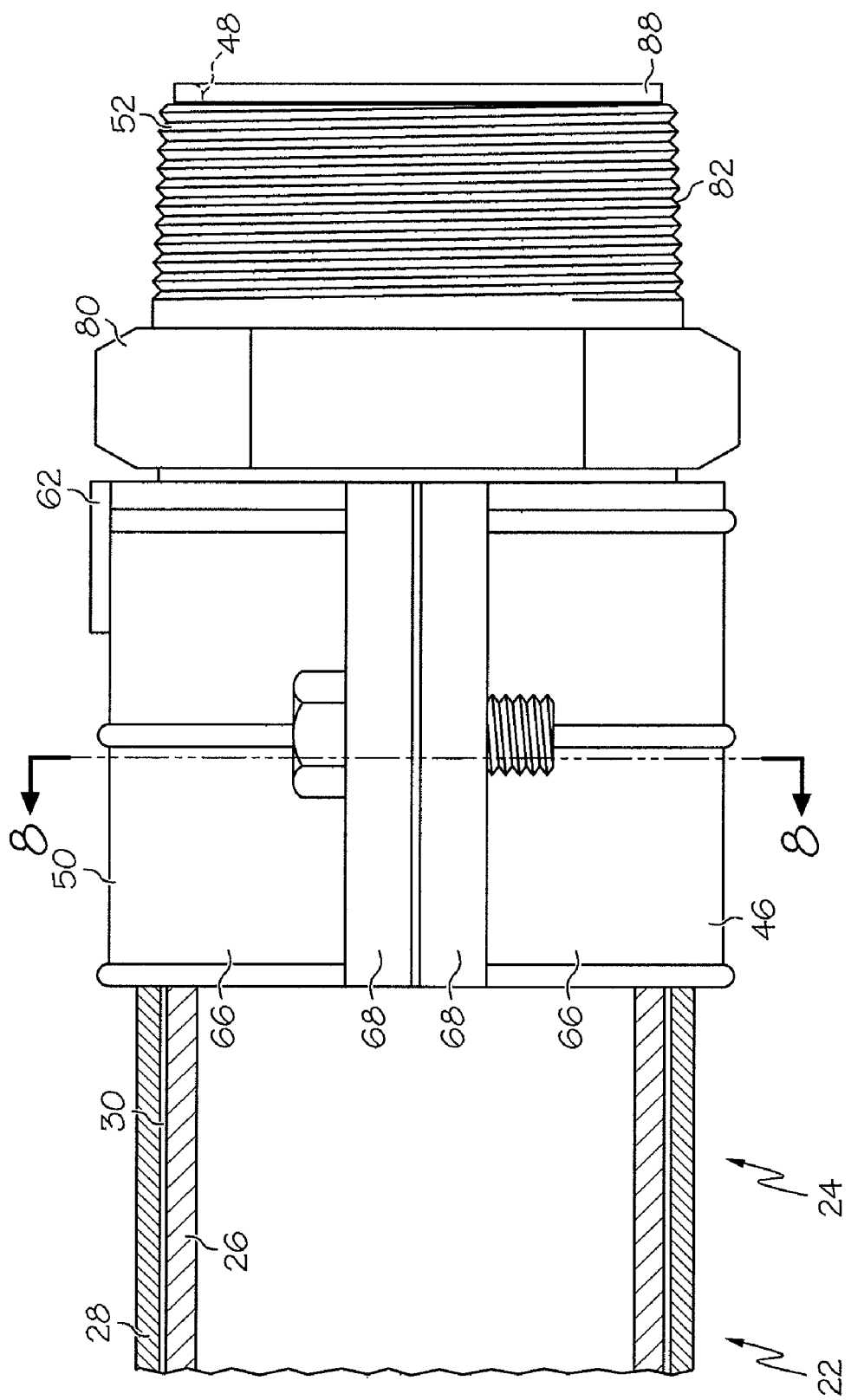
FIG. 7 is a side view of transition coupling of FIG. 5, with the pipe shown in cross section.

When the pipe coupling 50 is tightened down, the clamp portions 60 form a seal with each other, and with the pipe segment 24, about the annular gap 100. In particular, each protrusion 73 of a clamp portion 60 is urged into a recess 71, and into engagement with a seal 74, on the other clamp portion 60 to sealingly couple the clamp portions 60 together. Each recess 71 may be sized to be smaller, the same size, or slightly larger than the corresponding seal 74. In this manner, when the clamp portions 60 are urged together, the seals 74 are placed in compression by the associated protrusions 73, causing the seals 74 to expand and sealingly engage the side walls 65 of the recess 71, thereby forming a seal therewith. In addition, as shown in FIG. 7, the arrangement of seals 74 and recess 71 provides a convoluted path for fluid to breach the seals 74, thereby improving the sealing arrangement In addition, when the transition coupling 46 is assembled, the radially extending portions 78 of seals 74 engage the body 48/O-ring 58. The axially-extending portions 76 of the seals 74 may sealingly engage the outer surface of the secondary pipe 28. Finally, the barbed inner surfaces 72 of the clamp portions 60 forms a seal with the outer surface of the secondary pipe 28 (i.e. a fluid-tight metal-to-metal seal can be achieved with sufficient force; or an O-ring or the like can be utilized to aid in sealing). Accordingly, because the seals 74, O-ring 58 and clamp portions 60 seal around the secondary pipe 28 and the body 48, and the clamp portions 60 seal with each other the annular gap 100 is thereby sealed within the transition coupling 46, preserving the pressure within the interstitial space 30 of the pipe system 22/pipe segments 24.

Once the transition coupling 46 is mounted onto a pipe segment 24, an annular gap 100 (FIGS. 5 and 6) is positioned between the body 48 and the pipe coupling 50. The annular gap 100 is in fluid communication with the interstitial space 30. Each flange 68 may include an annular rib or end surface 90, which engages the axial end of the pipe segment 24 to prevent the pipe segment 24 from moving axially further into the pipe coupling 50 and ensure proper axial positioning of the pipe coupling 50. Thus end surfaces 90, 91 ensures that the annular gap 100 remains intact and is not closed by excessive axial movement of the pipe coupling 50 onto the pipe segment 24. Each clamp portion 60 may include an inner rim 93 which is received in a groove 95 of the fitting coupling 52 to further aid in axially positioning the clamp portions 60.

The fitting coupling 52 can then be utilized to couple the transition coupling 46 to a component or fitting, such as a T-fitting 40 (FIG. 2) or elbow fitting 45 (FIGS. 3 and 6), directly to another pipe segment, etc. In particular, as shown in FIG. 6, a female threaded opening 104 of the elbow fitting 45 can receive the male-threaded collar 82 of the fitting coupling 52 to fluidly secure the fitting 45 to transition coupling 46. However, as noted above the arrangement of the fitting coupling 52 and fitting 45 can be reversed such that the fitting coupling 52 has a female threaded opening, and the fitting 45 has the male threaded component. Moreover, various other coupling arrangements between the transition coupling 46 and the fitting 45 (or other component) may be utilized. In addition, although the transition coupling 46 is described herein as first being coupled to the pipe segment 24 and then to the fitting, it should be understood that the order of operations could be reversed and the transition coupling 46 could be first coupled to the fitting 45, and then to the pipe segment 24.

Before or after the transition coupling 46 is secured to the pipe segment 24 and the fitting 45, a tube, hose or the like 106 (FIGS. 1-3) may be coupled to the access port 62 (such as by a threaded connector 108 or the like) to communicate the pressure of the annular gap 100/interstitial space 30 as desired. As shown in FIG. 2, the tube 106 may be coupled to the access port 62 (and thereby the annular gap 100 and interstitial space 30) of another transition coupling 46 coupled to a pipe segment 24 in the same manner described above and shown herein. In this manner, two transition couplings 46 can be utilized to allow interstitial pressure to be communicated between two adjacent pipe segments 24a, 24b that have a "gap" in their continuous interstitial space 30, such as when they are connected by a T-fitting 40 or the like. As shown in FIGS. 1 and 3, the transition coupling 46 may also be used at the terminal end of the pipe system 22 (i.e., transition coupling 46 positioned below dispenser 14b). In this case the tube 106 may be capped, closed or otherwise sealed to maintain the interstitial pressure 30 in the system 22. Of course, the transition coupling 46 could also be used to maintain interstitial pressure about an elbow joint 45 by connecting to another transition coupling 46, should the pipe system 22 continue. As shown in FIG. 1, a transition coupling 46 can also be used to fluidly couple the interstitial space 30 of the pipe system 22 to the monitoring device 32. The transition coupling 46 can thus be used at various fittings, as noted above, and, as can be envisioned, at any location along the pipe system 22/pipe segments 24 where it is desired to communicate or preserve the pressure of the interstitial space 30 of the pipe system 22/pipe segments 24.

In this manner, all the interstitial spaces 30 of the pipe segments 24 can be fluidly coupled to form a closed system, thereby allowing a single monitoring device 32 to continuously monitor all pressure within the pipe segments 24. Alternately, if desired, multiple monitoring devices 32 can be utilized, although each monitoring device 32 can monitor multiple pipe segments 24 and/or discrete interstitial spaces 30. Further, alternately, rather than utilizing a monitoring device, a test port 62 of one of the transition couplings 46 may be placed in open communication with an associated sump or other open space so that fluid in the interstitial space 30 of the pipe system 22 can flow or seep into that sump and be detected visually, by sensors, or otherwise.

The use of the separable clamp portions 60 of the pipe coupling 50 provides the installer with great flexibility. In particular, the pipe coupling 50 does not need to be slid over the outer surface of the pipe segments 24 in the axial direction, thereby allowing the pipe coupling 50 to be mounted, or moved into place, from a radial, as opposed to axial, direction. Frictional forces, obstructions or the like may make axial sliding of the transition coupling 46 over the pipe segments 24 difficult. In addition, enabling the installer to install the clamp portions 60/pipe coupling 50 in a radial direction allows greater flexibility as any of a wide variety of radial directions may be selected by the installer to provide the most convenient mounting angle. In contrast, when axially sliding a pipe coupling, only one angle of approach can be utilized. In addition, the installer only needs access to one side of the pipe segment 24 to install the pipe coupling 50, as one clamp portion 60 can be placed against the pipe segment 24 and rotated to the other side of the pipe segment 24 while the other clamp portion 60 is installed. The sealing arrangement described and shown herein allows the pipe coupling 50 to be split for ease of assembly, yet sealed (to seal the annular gap 100/interstitial space 30) when mounted in place. The coupling 46 provides fluid-tight access to the interstitial space 30 without having to trim back the secondary pipe 28 and without requiring the use of a boot.

It should be understood that the clamp portions 60 illustrated herein comprises two generally equally sized, generally semi-cylindrical bodies. However, the pipe coupling 50/clamp portions 60 can be divided into radial segments of varying number and size. For example, two clamp portions 60 of unequal size (i.e., one extending radially about 210°, and the other extending radially about 150°) may be utilized.

Moreover, the pipe coupling 50 may include more than two clamp portions 60, such as three, four, or more, to provide a variety of manners in which the pipe coupling 50 can be assembled while still affording the advantages described above.

Although the invention is shown and described with respect to certain embodiments, it should be clear that modifications will occur to those skilled in the art upon reading and understanding the specification, and the present invention includes all such modifications.

What is claimed is:

1. A transition coupling system comprising:
   a dual containment pipe which includes an inner primary pipe and an outer secondary pipe with an interstitial space therebetween;
   an inner body engaging an inner surface of the primary pipe; and
   an outer body engaging an outer surface of the secondary pipe, the outer body including at least two releasably attached portions, at least one of which when unattached is movable relative to the other in a radial direction thereof, wherein the inner body and the outer body define a gap therebetween and wherein said attachment portions sealingly engage each other or said inner body or said outer body or said pipe such that the gap is sealed and in communication with the interstitial space of the dual containment pipe.

2. The system of claim 1 wherein at least one outer body portion includes a seal engaging the other outer body portion such that said outer body portions are sealingly engaged when coupled together by moving at least one of said outer body portions toward the other in a generally radial direction.

3. The system of claim 2 wherein one of said outer body portions includes a protrusion and the other one of said outer body portions includes a recess, wherein said protrusion is received in said recess with said seal positioned therebetween.

4. The system of claim 3 wherein said recess closely receives said seal therein such that said protrusion compresses said seal, causing said seal to expand and sealingly engage said recess.

5. The system of claim 2 further including a base seal extending circumferentially about said base, and wherein said seal of said outer body portion engages said base seal.

6. The system of claim 5 wherein said seal of said outer body portion includes a generally axially-extending portion and a generally radially-extending portion which engages said base seal.

7. The system of claim 1 wherein each of said outer body portions includes a seal engaging the other outer body portion such that said outer body portions are sealingly engaged.

8. The system of claim 7 wherein each of said outer body portions includes a protrusion and a recess, and wherein each protrusion of one of said outer body portions is received in said recess of another one of said outer body portions with one of said seals positioned therebetween.

9. The system of claim 8 wherein each portion includes a pair of opposed radially-outwardly extending flanges, wherein each flange includes a recess or a protrusion thereon.

10. The system of claim 1 further comprising a threaded fitting coupling that is coupled to an axial end of said inner body.

11. The system of claim 1 wherein said inner body includes generally cylindrical engagement surface engaging said inner surface of said primary pipe, and said outer body includes a generally cylindrical engagement surface engaging said outer surface of said secondary pipe, wherein said engagement surface of said outer body is coaxial with said engagement surface of said inner body.

12. The system of claim 11 wherein each engagement surface is a ribbed surface.

13. The system of claim 1 wherein said portions are coupled to said piping system by a fastener extending through each portion and oriented generally perpendicular to a central axis of said piping system.

14. The system of claim 1 wherein at least one of said outer body portions is removable from said dual containment pipe and from the other one of said outer body portions by moving said at least one outer body portion in a generally radial direction.

15. The system of claim 1 wherein said outer body includes a lip engaging said dual containment pipe to axially position said dual containment pipe relative to said transition coupling.

16. The system of claim 1 wherein said inner body includes a lip engaging said dual containment pipe to axially position said dual containment pipe relative to said transition coupling.

17. The system of claim 1 wherein said transition coupling includes an opening communicating from an outer surface thereof to said gap.

18. The system of claim 17 wherein said opening extends generally radially and is configured to be fluidly coupled to a tube to allow a pressure of said interstitial space to be communicated via said opening and said tube.

19. A transition coupling system comprising:
    a dual containment pipe;
    an inner body grippingly inserted into an inner surface of a primary pipe of said dual containment pipe; and
    an outer body including at least two separable portions positioned generally about said dual containment pipe by moving at least one portion toward the other portion in a generally radial direction while trapping said dual containment pipe therebetween, wherein said inner body and the outer body define a gap therebetween when coupled to said dual containment pipe such that the gap is generally sealed by said separable portions and wherein the gap is in communication with an interstitial space of the dual containment pipe.

20. A method for attaching a transition coupling system comprising:
    accessing a dual containment pipe which includes an inner primary pipe and an outer secondary pipe with an interstitial space therebetween;
    accessing a transition coupling including an inner body and an outer body including at least two portions;
    inserting said inner body into said dual containment pipe such that said inner body engages an inner surface of the primary pipe;
    placing one of said portions of said outer body adjacent to an outer surface of the secondary pipe;
    placing the other portion of said outer body adjacent to the outer surface of the secondary pipe by moving the other portion in a radially inward direction; and
    joining the portions of the outer body together such that the inner body and the outer body define a gap therebetween which is generally sealed by said portions and in fluid communication with the interstitial space.

* * * * *